United States Patent
Ohtaka et al.

(10) Patent No.: US 7,075,562 B2
(45) Date of Patent: Jul. 11, 2006

(54) OPTICAL SCANNING DEVICE (75) Inventors: Kouichi Ohtaka, Miyagi (JP); Takeshi Nanjyo, Miyagi (JP); Seiichi Katoh, Miyagi (JP)

(73) Assignee: Ricoh Company, Ltd., Tokyo (JP)

(*) Notice: Subject to any disclaimer, the term of this patent is extended or adjusted under 35 U.S.C. 154(b) by 406 days.

(21) Appl. No.: 10/449,115

(22) Filed: Jun. 2, 2003

(65) Prior Publication Data
US 2004/0012667 A1 Jan. 22, 2004

(30) Foreign Application Priority Data
Jul. 17, 2002 (JP) ............................. 2002-208169
Nov. 22, 2002 (JP) ............................. 2002-338850

(51) Int. Cl.
B41J 2/47 (2006.01)
(52) U.S. Cl. ...................................... 347/239; 347/255
(58) Field of Classification Search ........ 347/237–239, 347/240–244, 247–248, 251–256, 134; 355/71, 355/54; 430/396; 378/162; 359/443, 298
See application file for complete search history.

(56) References Cited

U.S. PATENT DOCUMENTS

| | | | |
|---|---|---|---|
| 5,017,987 A | 5/1991 | Nanjoh et al. | |
| 5,108,843 A | 4/1992 | Ohtaka et al. | |
| 5,304,357 A | 4/1994 | Sato et al. | |
| 5,408,113 A | 4/1995 | Kanno et al. | |
| 5,448,113 A | 9/1995 | Suzuki et al. | |
| 5,633,523 A | 5/1997 | Kato | |
| 5,668,413 A | 9/1997 | Nanjo | |
| 5,811,353 A | 9/1998 | Nanjo | |
| 6,150,698 A | 11/2000 | Ohtsuka et al. | |
| 6,312,108 B1 | 11/2001 | Kato | |
| 6,324,149 B1 | 11/2001 | Mifune et al. | |
| 6,332,669 B1 | 12/2001 | Kato et al. | |
| 6,335,828 B1* | 1/2002 | Hashimoto et al. | ......... 359/443 |
| 6,367,914 B1 | 4/2002 | Ohtaka et al. | |
| 6,450,618 B1 | 9/2002 | Kato et al. | |
| 6,467,881 B1 | 10/2002 | Katoh | |
| 6,485,126 B1 | 11/2002 | Kato et al. | |
| 6,537,738 B1* | 3/2003 | Mei et al. | ............. 430/396 |
| 6,552,779 B1* | 4/2003 | Mei | ............................. 355/71 |
| 2003/0053598 A1* | 3/2003 | Sumi et al. | ................. 378/162 |
| 2004/0012667 A1 | 1/2004 | Ohtaka et al. | |

OTHER PUBLICATIONS

U.S. Appl. No. 09/988,147, filed Nov. 19, 2001, Ohtaka.
U.S. Appl. No. 10/050,865, filed Jan. 18, 2002, Ohtaka et al.

(Continued)

Primary Examiner—Hai Pham
(74) Attorney, Agent, or Firm—Oblon, Spivak, McClelland, Maier & Neustadt, P.C.

(57) ABSTRACT

An optical scanning device includes optical modulation means having an one-dimensional optical modulator array wherein a plurality of optical modulators are arranged one-dimensionally; lighting means; and a scanning optical system for deflecting the beams modulated by the optical modulators in the one-dimensional optical modulator array in a direction perpendicular to the arrangement direction of the optical modulators. A plurality of the one-dimensional optical modulator arrays are arranged in a direction perpendicular to the arrangement direction of the optical modulators. The beams modulated by respective optical modulators of the one-dimensional optical modulator arrays can be irradiated on a pixel in piles.

18 Claims, 8 Drawing Sheets

OTHER PUBLICATIONS

U.S. Appl. No. 10/294,033, filed Nov. 14, 2002, Nanjyo et al.
U.S. Appl. No. 10/449,115, filed Jun. 2, 2003, Ohtaka et al.
U.S. Appl. No. 10/822,816, filed Apr. 13, 2004, Nanjyo et al.
U.S. Appl. No. 10/875,228, filed Jun. 25, 2004, Nanjyo et al.
U.S. Appl. No. 11/265,206, filed Nov. 3, 2005, Katoh et al.
U.S. Appl. No. 11/252,815, filed Oct. 19, 2005, Nanjo et al.
U.S. Appl. No. 11/255,112, filed Oct. 21, 2005, Seiichi et al.

* cited by examiner

OPTICAL SCANNING DEVICE

BACKGROUND OF THE INVENTION

1. Field of the Invention

The present invention relates to optical scanning devices for expanding and projecting images on screen surfaces and the like, and more specifically an optical scanning device in which a one-dimensional optical modulator array is used.

2. Description of the Related Art

An optical scanning device, in which a beam from a simple one-dimensional optical modulator array is scanned so that a two-dimensional image is expanded and indicated on a screen, is known. For example, U.S. Pat. No. 5,311,360 and "Technical Digest Solid State Sensors and Actuators Workshop, Hilton Head Island, S.C. Jun. 13–16, 1994" disclose an optical scanning device in which a plurality of optical modulators having diffraction grating surfaces are arranged one-dimensionally.

In addition, the applicant of this patent application suggests an optical scanning device in which a plurality of mirror type optical modulators having high efficiencies of optical use are arranged one-dimensionally, in pending Japanese patent application No. 2002-7204.

In these optical scanning devices, a two-dimensional image can be expanded and indicated on the screen surface by deflecting the beam from the one-dimensional optical modulator array in a direction perpendicular to the arrangement direction of the optical modulators and by the beam forming an image on the screen.

However, the optical scanning device, in which the simple one-dimensional optical modulator array is used, has a problem in that amounts of light for pixels are insufficient.

Furthermore, the above mentioned optical scanning device has the following problem with regard to the response speed of the optical modulators forming the one-dimensional optical modulator array. It is assumed that a one-dimensional optical modulator array having 1536 optical modulators (1536 pixels) in total is used and 2048 pixels are indicated in the scanning direction of the beam. That is, a case is assumed where a two-dimensional image having a resolution of Q×GA (1536×2048 pixels) is indicated. In this case, the response speed (a switch speed) required for the optical modulators (optical switch elements) can be estimated as follows.

When the two-dimensional image has a frame frequency of 60 [Hz] that is a normal value, a time for indicating one frame of the two-dimensional image is 1/60 [second], namely 16.7 [msec]. Since the one-dimensional optical modulator array has to indicate 2048 pixel lines in the scanning direction during the above mentioned period of time, the indicating time per one pixel line is calculated as $16.7/2048$ [msec], namely 8.15 [μsec]. If response time of the optical modulators for indicating 256 gradations during the above mentioned period of time is set as 20% of the indicating time of the pixels, when an analog modulation for modulating the amount of light from zero to maximum is performed, the indicating time per one pixel line is calculated as 1.63 [μsec]. In addition, when a digital modulation for modulating in phases an integral amount of light per unit time from zero to maximum is performed, the indicating time per one pixel line is calculated as 0.00637 [μsec]. The response times for the above mentioned cases correspond to a frequency of response of 613 [kHz] and a frequency of response of 156 [MHz], respectively.

Thus, there is problem in that a high response frequency is required for an optical switch device in a case where it is desired to achieve an image having a high modulation, especially when digital modulation is performed.

SUMMARY OF THE INVENTION

Accordingly, it is a general object of the present invention to provide a novel and useful optical scanning device in which one or more of the problems described above are eliminated.

Another and more specific object of the present invention is to provide an optical scanning device by which the amount of a scanning light that is scanned for pixels can be increased as compared with the optical scanning device in which the related art one-dimensional optical modulator array is used, and by which an image having a great number of gradations can be indicated without raising the response speed of the optical modulators.

The above objects of the present invention are achieved by an optical scanning device, including:

optical modulation means for modulating a beam and having an one-dimensional optical modulator array wherein a plurality of optical modulators are arranged one-dimensionally;

lighting means for lighting the one-dimensional optical modulator array; and a scanning optical system for deflecting the beams modulated by the optical modulators in the one-dimensional optical modulator array in a direction perpendicular to the arrangement direction of the optical modulators, wherein a plurality of the one-dimensional optical modulator arrays are arranged in a direction perpendicular to the arrangement direction of the optical modulators, and the beams modulated by respective optical modulators of the one-dimensional optical modulator arrays can be irradiated on a pixel in piles.

According to the above mentioned optical scanning device, the beam modulated by respective optical modulators in a plurality of one-dimensional optical modulator arrays that are arranged in a line is scanned in a direction perpendicular to the direction of arrangement of the optical modulators in the one-dimensional optical modulator arrays. A plurality of the beams modulated by the respective optical modulators in the plurality of the one-dimensional optical modulator arrays can be irradiated to respective pixels forming the image in piles multiple times. Therefore, when the optical modulators are analog-modulated, it is possible to achieve a brighter image indication than in a case where the simple one-dimensional optical modulator array is used. Furthermore, when the optical modulators are digital-modulated, it is possible to achieve an image indication having a greater number of gradations than in a case where the simple one-dimensional optical modulator array is used, without raising the response speed of the optical modulators in the one-dimensional optical modulator arrays.

Other objects, features, and advantages of the present invention will become more apparent from the following detailed description when read in conjunction with the accompanying drawings.

DETAILED DESCRIPTION OF THE PREFERRED EMBODIMENTS

A description will now be given, with reference to the FIGS. 1 through 8, of embodiments of the present invention.

Figure 1:
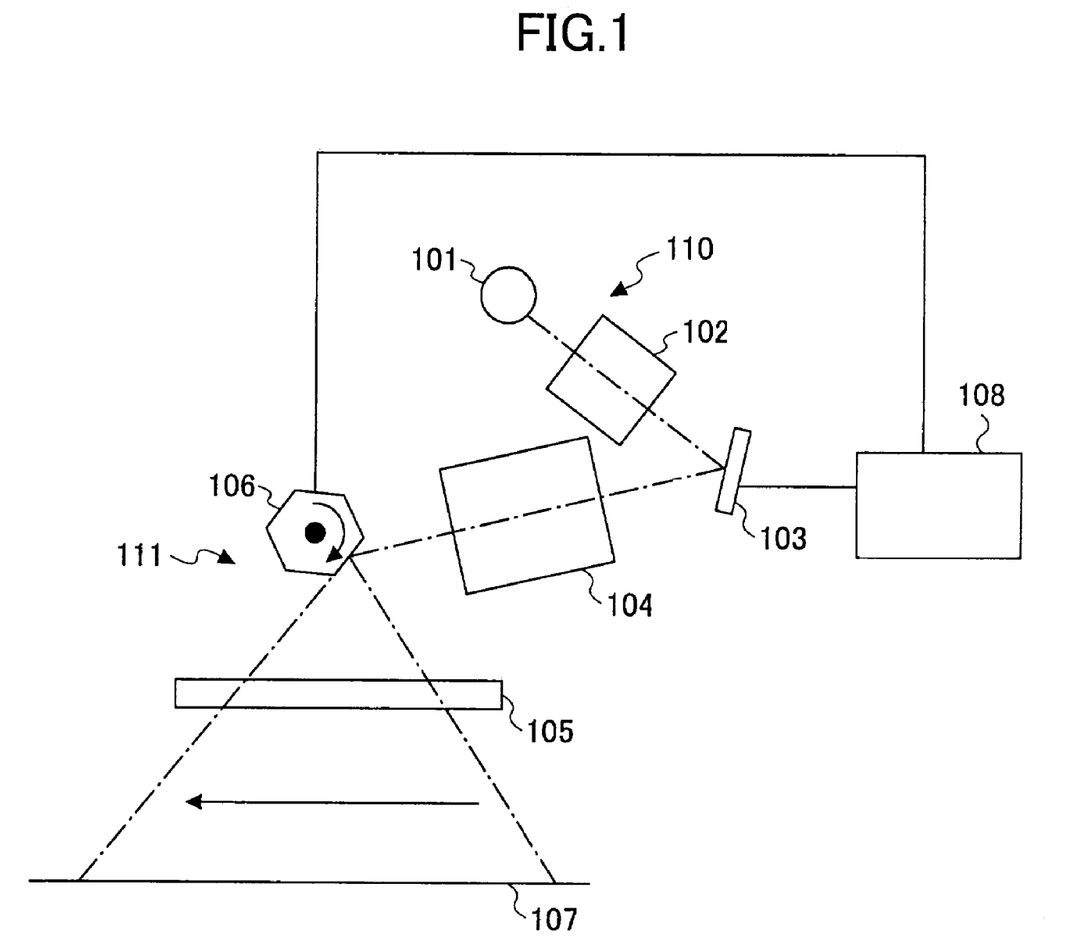
FIG. 1 is a schematic structural view of an optical scanning device of an embodiment of the present invention.

FIG. 1 is a schematic structural view of an optical scanning device of an embodiment of the present invention. The optical scanning device of this embodiment includes optical modulation means 103, lighting means 110, a scanning optical system 111, and control means 108. The optical modulation means 103 has a structure where a plurality of one-dimensional optical modulation arrays are arranged in a line. The lighting means 110 lights respective optical modulators of the optical modulation means 103. The scanning optical system 111 scans beams modulated by the respective optical modulators of the optical modulation means 103 in a direction perpendicular to the arrangement direction of elements of the one-dimensional optical modulator arrays. The control means 108 controls actions of the optical modulation means 103 and the scanning optical system 111.

The lighting means 110 includes a light source 101 and a lighting optical system 102 for introducing a beam emitted from the light source 101 to respective optical modulators of the optical modulation means 103.

The above mentioned scanning optical system 111 includes a rotating polygon mirror 106 which rotates at a high speed, an optical system 104, and a projection optical system 105. The optical system 104 introduces the beams modulated by respective optical modulators of the optical modulation means 103 to a mirror surface of the rotating polygon mirror 106. The projection optical system 105 is an optical system by which a beam scanned (deflected) by the mirror surface of the rotating polygon mirror 106 is projected and an image is formed at the screen surface 107 as an image indication object surface.

The beam (illustrated by a dotted line) emitted from the light source 101 is introduced to the respective optical modulators of the optical modulation means 103 by the light optical system 102. The respective optical modulators of the optical modulation means 103 is synchronized with the rotation of the rotating polygon mirror 106 by the control means 108 and driven by following an image signal. In the scanning optical system 111, the beam (illustrated by a dotted line) modulated by the optical modulator of the optical modulation means 103 is introduced to a mirror surface of the rotating polygon mirror 106 by the optical system 104 and scanned in a direction perpendicular to the arrangement direction of the optical modulators. As a result of this, the beam is projected and an image is formed at the screen surface 107 by the projection optical system 105. A correction for an deformation of the image on the screen surface 107 is performed by the scanning optical system 111.

Although the rotating polygon mirror 106 is used in the above mentioned embodiment, a galvano mirror may be used for the scanning optical system 111 so that variable speed scanning can be performed easily. An embodiment using the above mentioned galvano mirror (not shown) is included in the present invention.

A plurality of the one-dimensional optical modulation arrays are arranged in a line for the optical modulation means 103. As the one-dimensional optical modulator array, a reflection type optical switch element, a transmit type crystal liquid optical switch element, a mirror device such as a DMD (digital mirror device) sold by Texas Instruments Incorporated, GLV (diffraction type optical modulator) announced by Silicon Light Machine, and the like, may be arranged one-dimensionally so as to form the optical modulation means 103. An embodiment using the above mentioned one-dimensional optical modulator array (not shown) is included in the present invention. The one-dimensional optical modulation array where the optical modulators are arranged in an array, proposed in the pending Japanese patent application No. 2001-10870 by this applicant, is used for this embodiment.

Figure 2:
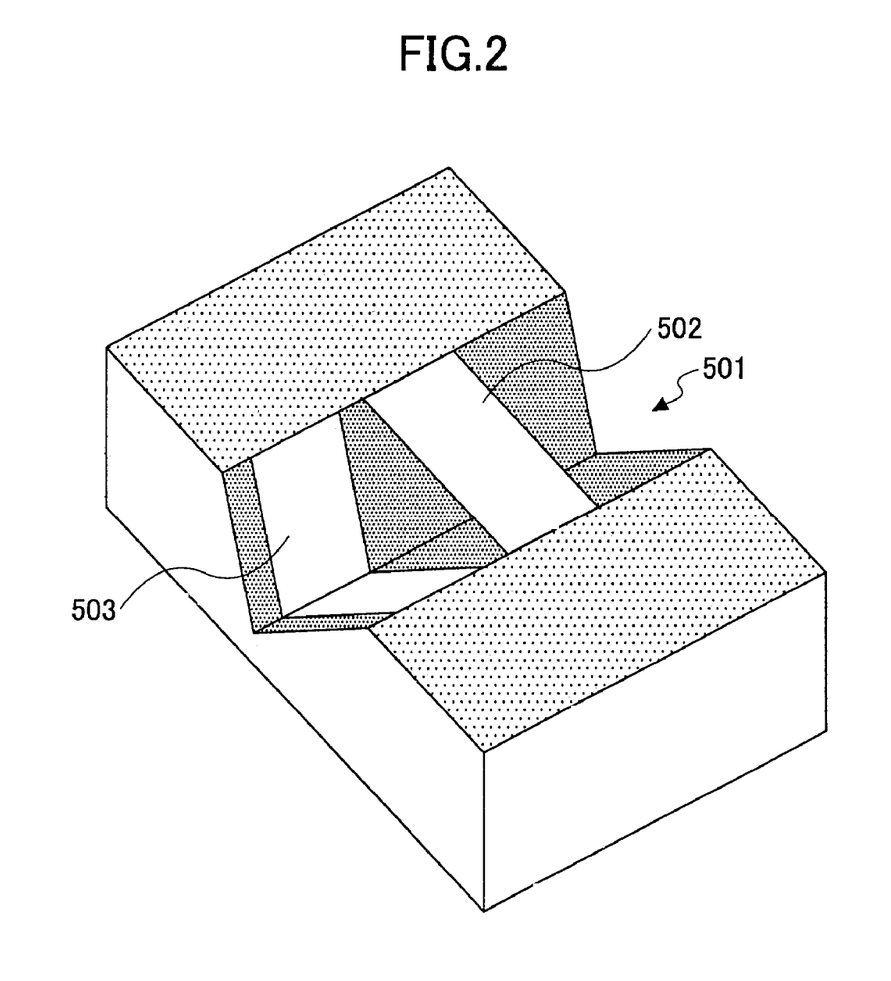
FIG. 2 is a schematic perspective view showing an example of an optical modulator.

FIG. 2 is a schematic perspective view showing an example of an optical modulator. As shown in FIG. 2, the optical modulator has a structure where a mirror 502 having both ends fixed beam structure is formed over a v-shaped groove 501. An electrostatic actuator is formed between this mirror 502 and an electrode (not shown) formed in the v-shaped groove 501. Based on an action of this electrostatic actuator, the mirror 502 is deformed so as to come in contact with a walled surface of the v-shaped groove (as shown by a number "503" in FIG. 2) and the light reflection direction is changed by the mirror 502. As a result of this, the beam is modulated.

Figure 3:
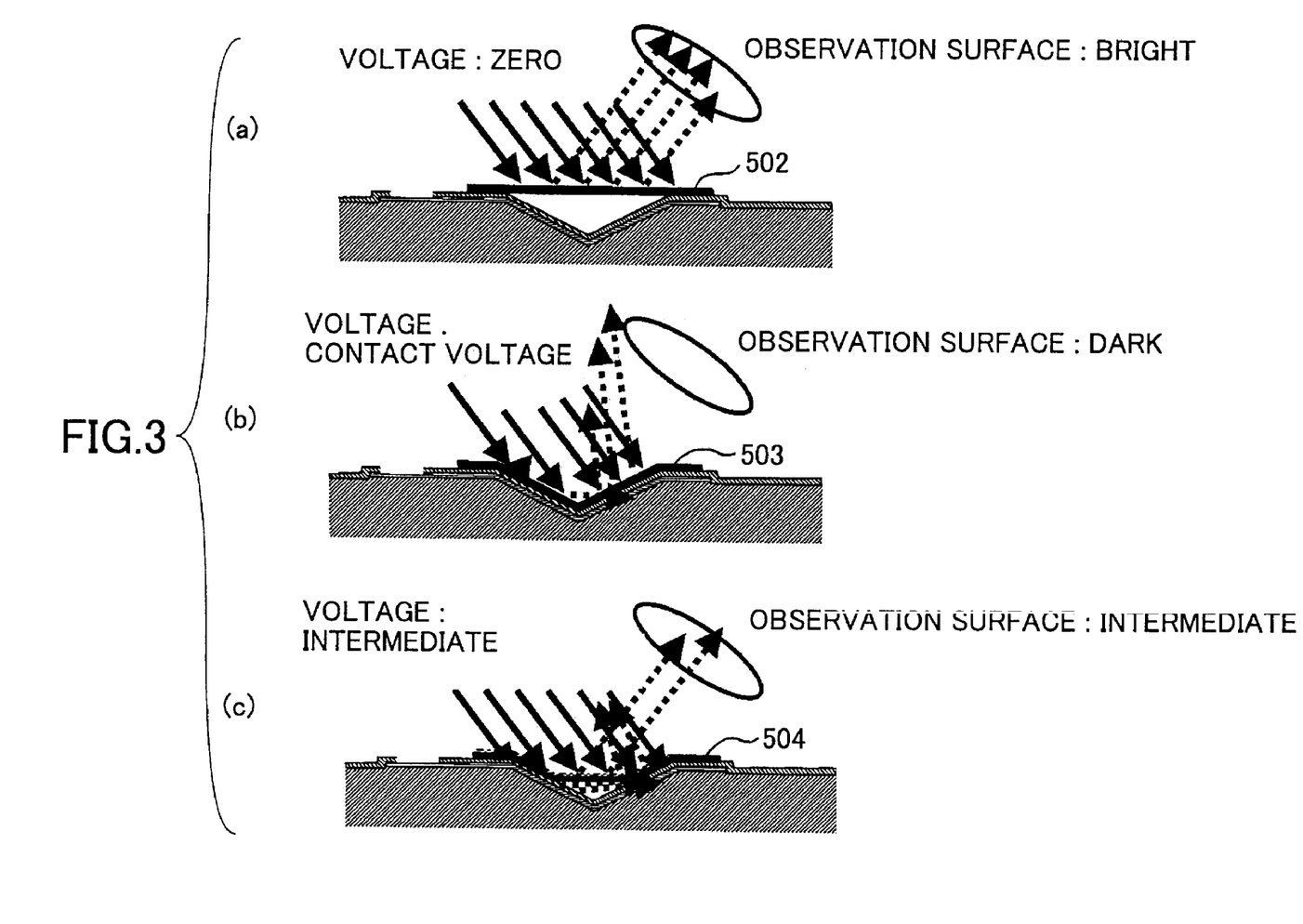
FIG. 3 is a schematic cross-sectional view for an explanation of an action of the optical modulator shown in FIG. 2.

FIG. 3 is a schematic cross-sectional view for an explanation of an action of the optical modulator shown in FIG. 2. As shown in FIG. 3-($a$), in a case where a voltage is not applied to the electrode, the mirror 502 maintains a plane surface. In this case, an incident beam is directly reflected by the mirror surface. When the scanning optical system 111 is arranged in the direction of the reflection beam at this time, the reflected scanning beam is in a "bright" state.

When a contact voltage is applied to the electrode, as shown in FIG. 3-($b$), the mirror 503 is deformed and comes in contact with a wall surface of the v-shaped groove. Assuming that the inclination angle of the v-shaped groove is set at "θ" degrees, the reflection beam is reflected in a direction that is ±2"θ" off from the beam angle in the state prior to a mirror deformation. By setting the angle "θ" so that the scanning optical system 111 does not receive this beam, the reflection beam is in a "dark" state.

When an intermediate voltage is applied to the electrode, as shown in FIG. 3-($c$), the mirror 504 can be deformed so that the reflected scanning beam has an intermediate amount of light.

Figure 4:
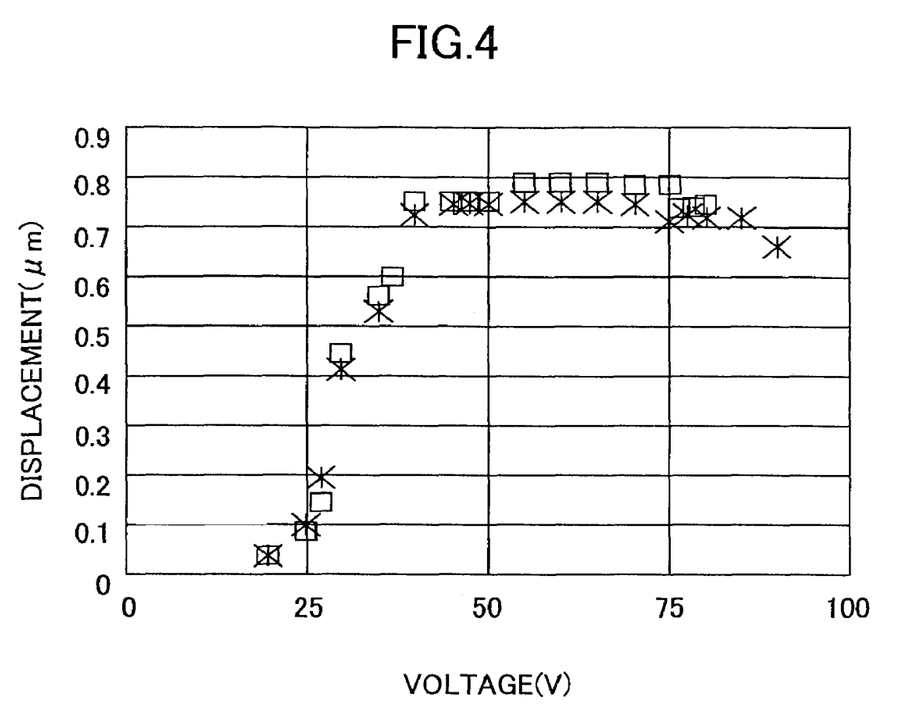
FIG. 4 is a graph showing a driving voltage of the optical modulator shown in FIG. 2 and a measurement result of a mirror displacement.

FIG. 4 is a graph showing a driving voltage of the optical modulator shown in FIG. 2 and a measurement result of the mirror displacement. More specifically, FIG. 4 shows measurement data of an applied voltage to an electrode and a displacement amount at the center part of the mirror, in a case where the mirror of the optical modulator has a size of 10 μm×25 μm (the length between fixed end parts is 25 μm) and the v-shaped groove has a depth of 0.8 μm. Referring to FIG. 4, the displacement amount at the mirror center part is increased at a constant rate between voltages of 20[V] and 40[V]. That is, an intermediate deformation state of the mirror shown in FIG. 3-(c) can be controlled in this voltage range. In this intermediate state, the scanning beam can be analog-modulated by receiving the reflection beam from the undeformed part of the mirror to the scanning optical system 111.

Figure 5:
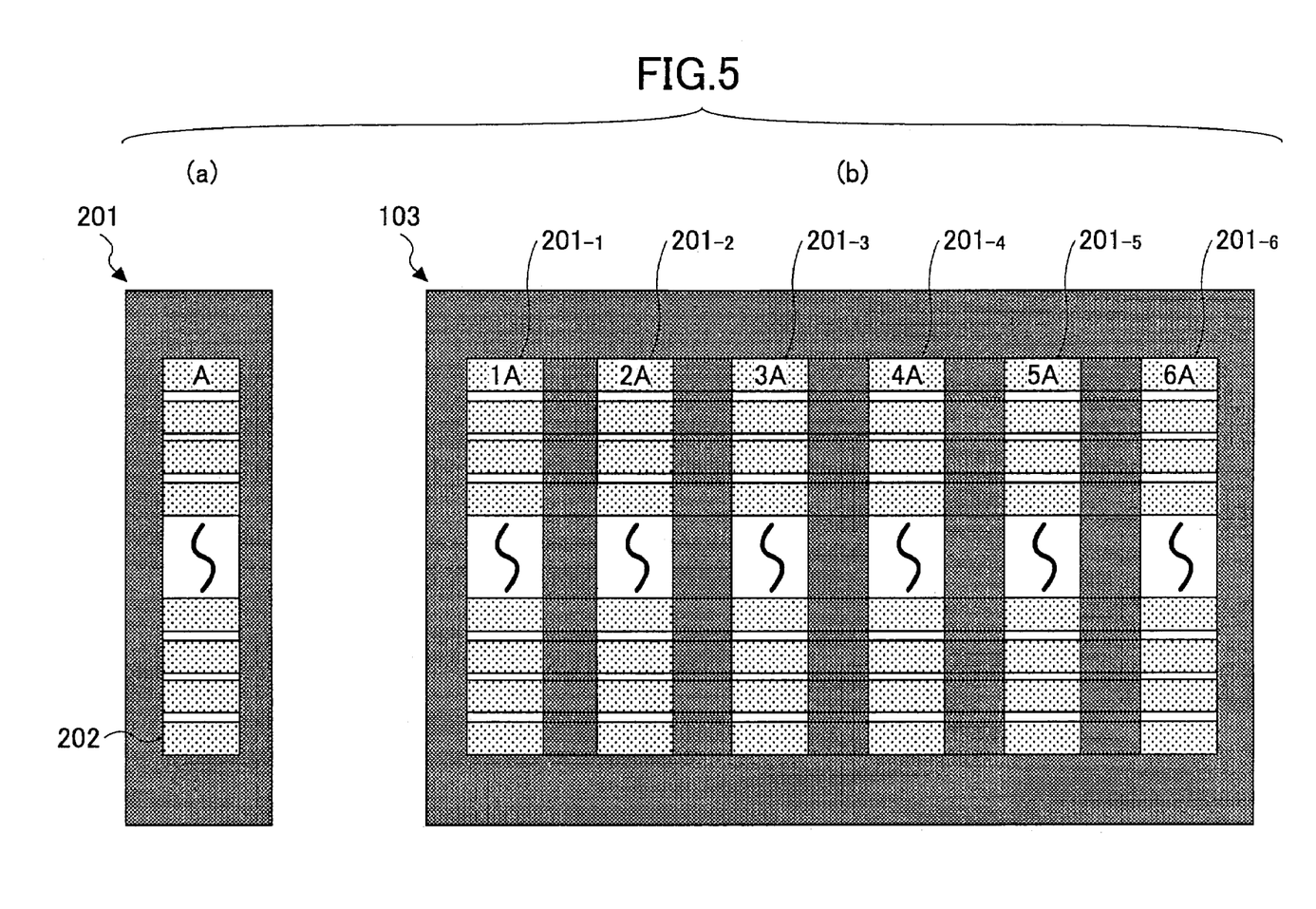
FIG. 5 is a view for an explanation of a one-dimensional optical modulator array used as optical modulation means and an arrangement of the one-dimensional optical modulator array.

FIG. 5 is a view for an explanation of a one-dimensional optical modulator array used as optical modulation means and an arrangement of the one-dimensional optical modulator array. More specifically, a one-dimensional optical modulator array 201 used for the optical modulation means 103 is shown in FIG. 5-(a). The one-dimensional optical modulator array 201 has a structure where 1536 optical modulators explained with reference to FIGS. 2 through 4 are arranged so as to make a straight line. Each optical modulator has the movable mirror 202 having a size of 23 [μm]×50 [μm] which corresponds to the mirror 502 having a both ends fixed beam structure shown in FIG. 2. The gap between elements is 2 [μm] and the element arrangement pitch is 25 [μm]. However, this value is just an example.

As shown in FIG. 5-(b), six one-dimensional optical modulator arrays 201-1 through 201-6 are arranged in the optical modulation means 103 in a line. The gap between the one-dimensional optical modulator arrays is 50 [μm] and the pitch of the array arrangement is 100 [μm]. That is, the pitch of the array arrangement is twice the size of the optical modulator in the direction of the array arrangement (mirror size 50 [μm]). As described later, it is preferable that the pitch of the array arrangement be an integer multiple of the optical modulator size in the array arrangement direction.

Figure 6:
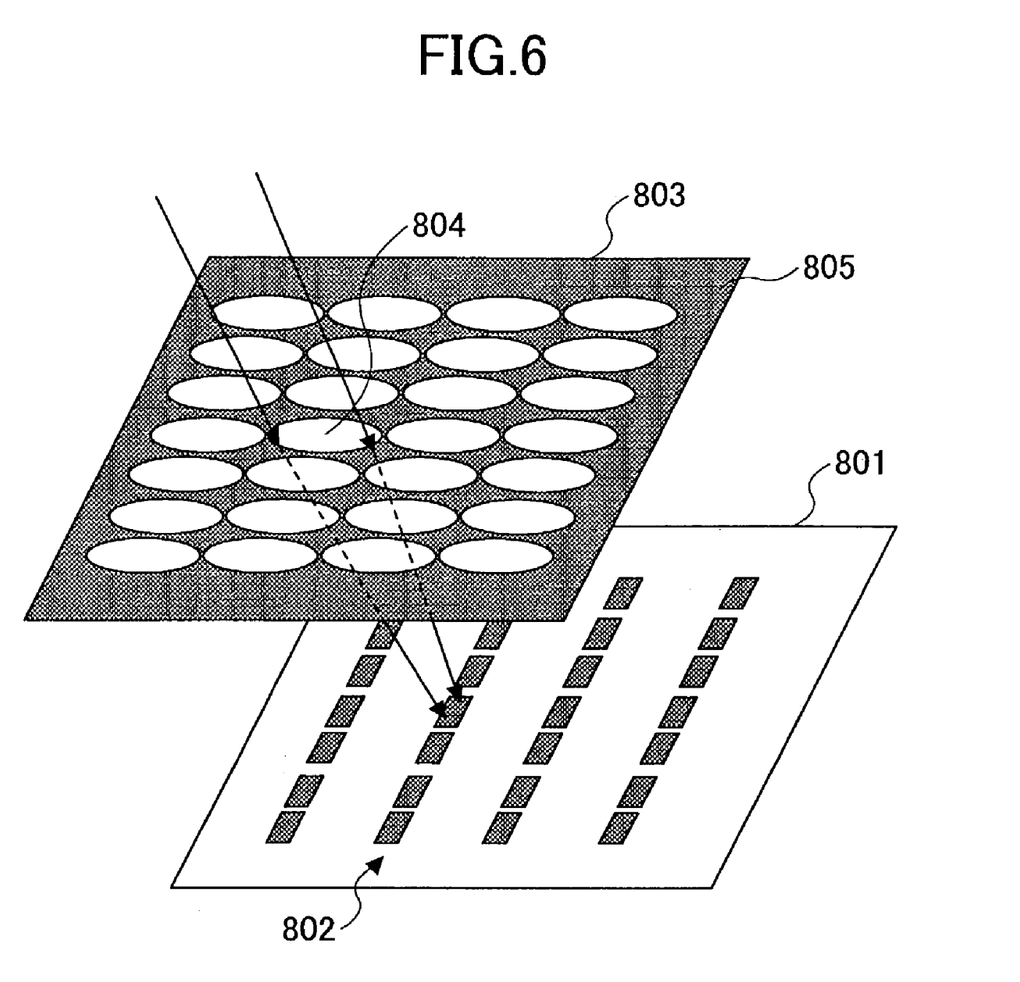
FIG. 6 is a view showing an example of a structure where a micro lens array is provided for lighting means.

FIG. 6 is a view showing an example of a structure where a micro lens array is provided for the lighting means 110. Four lines of the one-dimensional optical modulator arrays 802 are formed on an optical modulator array substrate 801 shown in FIG. 6. A plurality of micro lenses 804 are arranged and formed on a substrate 803 forming the micro lens array so as to optically correspond to respective optical modulators of the optical modulator arrays 802 one to one. A lightproof film 805 is formed at the surroundings of the micro lenses 804, namely the space between neighboring micro lenses 804. An arrow in FIG. 6 represents a beam from a light source. The beam from the light source is concentrated by the micro lens 804 and introduced to the corresponding optical modulator 802. Hence, the light from the light source can be used reliably. Since a light not passing through the micro lens 804 due to the lightproof film 805 does not reach the optical modulator array substrate 801, the amount of stray light is reduced so that contrast is raised.

Next, an action for projecting an image having a resolution of QxGA (1536×2048) will be described with references to FIG. 7 and FIG. 8.

Figure 7:
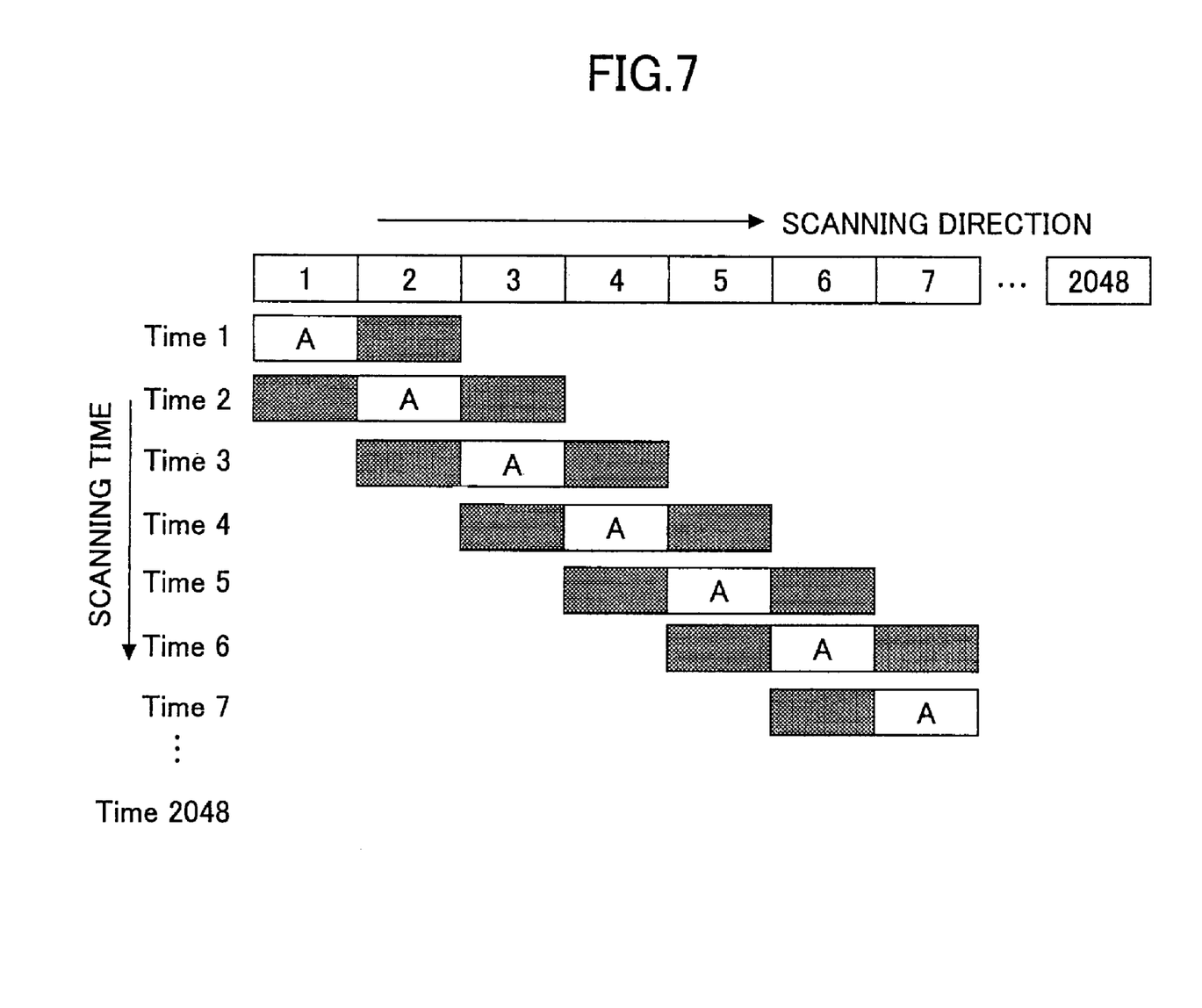
FIG. 7 is a view for an explanation of a scanning action in a case where only a single one-dimensional optical modulator array is provided.
Figure 8:
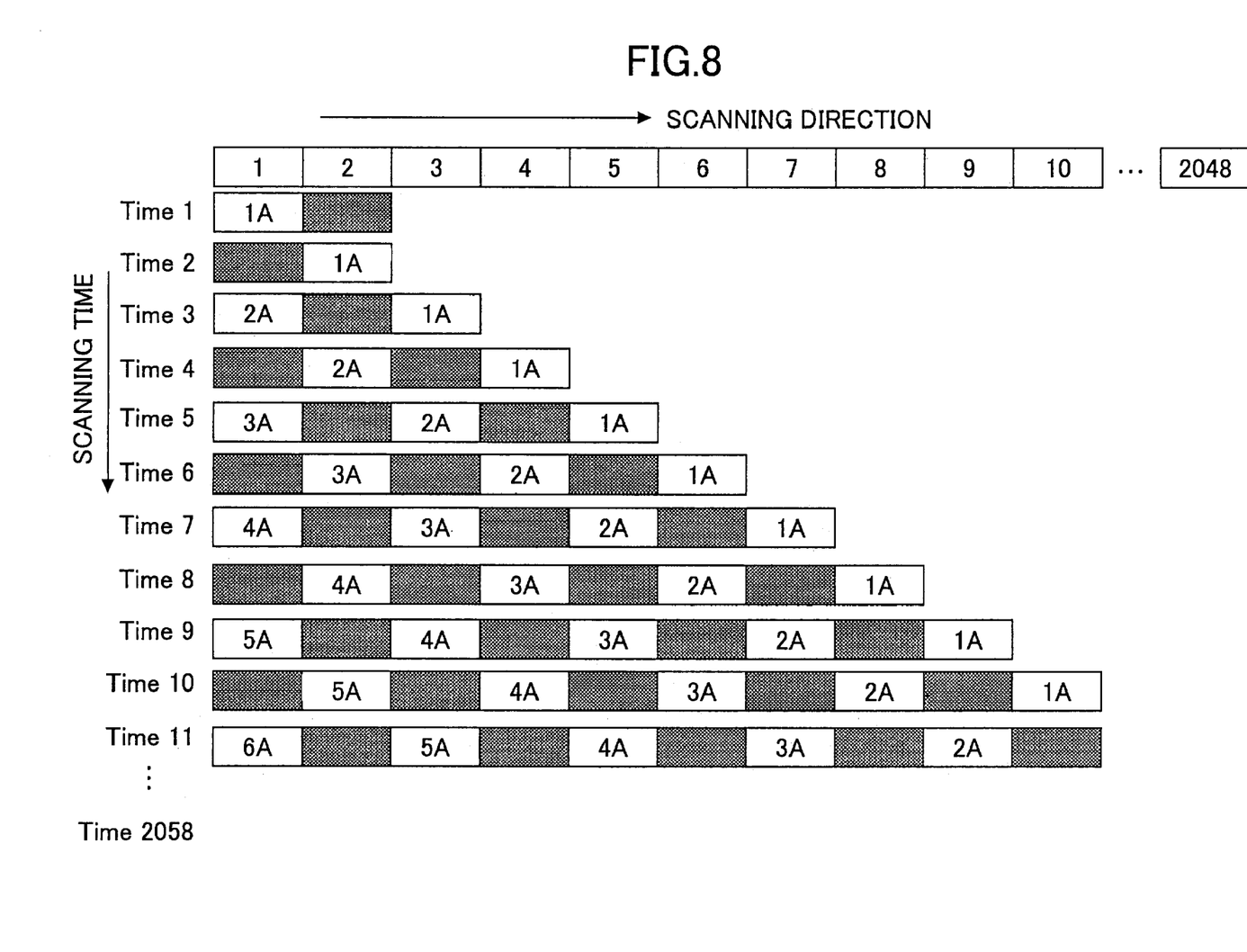
FIG. 8 is a view for an explanation of a scanning action in a case where six one-dimensional optical modulator arrays are provided.

FIG. 7 is a view for an explanation of a scanning action in a case where only a single one-dimensional optical modulator array 802 is provided for the optical modulation means 103. FIG. 8 is a view for an explanation of a scanning action, according to the present embodiment, in a case where six one-dimensional optical modulator arrays 802 are provided. Referring to FIGS. 7 and 8, the horizontal axis represents a pixel position (pixel numbers 1 through 2048) on the screen surface in a scanning direction by the scanning optical system 111 and the vertical axis represents a scanning time division (time 1 through time 2048) in one frame time.

Referring to FIG. 7, an action when the optical modulation means 103 includes one one-dimensional optical modulator array 802 will be described. An optical modulator A (See FIG. 5-(a)) situated at a head part of the one-dimensional optical modulator array 802 will be focused on in the following description. The beam modulated by this optical modulator A forms an image at the position of pixel number 1 on the screen at first scanning time division Time 1 in a frame time. That is, the optical modulator A is driven so as to obtain a gradation of the pixel number 1 at this timing. The image-forming position of the beam modulated by the optical modulator A is moved to positions of pixel numbers 2, 3, . . . at the following scanning time division Times 2, 3, . . . in turn. The beam forms an image at the last pixel number 2048 at the last scanning time division Time 2048. In a case of a beam modulated by other optical modulators in the one-dimensional optical modulator array as well as the above described beam, a two-dimensional image is indicated on the screen surface. Normally, the frame frequency is set as 60 [Hz], time for indicating one frame is set as 1/60 [second], namely 16.7 [msec]. Since the one dimensional optical modulator array has to indicate 2048 pixel lines in the scanning direction during the above mentioned period of time, an indicating time per one pixel line is calculated as $16.7/2048$ [msec], namely 8.15 [μsec]. In order to indicate 256 gradations during the above mentioned period of the indicating time, if a response time of respective elements of the one-dimensional optical modulator array is set as 20% of the indicating time, the following response time can be obtained. That is, in a case where analog modulation is performed by the optical modulator so as to modulate an actual amount of light from zero to maximum, the response time of 1.63 [μsec] can be obtained. The response time of 1.63 [μsec] corresponds to a response frequency of 613 [kHz]. Furthermore, in a case where digital modulation is performed by the optical modulator so as to modulate an integral amount of light per unit time in phases from zero to maximum, the response time of 0.00637 [μsec] can be obtained. The response time of 0.00637 [μsec] corresponds to a response frequency of 156 [MHz].

Next, referring to FIG. 8, an action of this embodiment will be described. The optical modulators 1A through 6A (See FIG. 5-(b)) situated at head parts of six one-dimensional optical modulator arrays 201-1 through 201-6, respectively, will be focused on in the following description. First, the beam modulated by the optical modulator 1A forms an image at the position of pixel number 1 on the screen at the first scanning time division Time 1 in a frame time. That is, the optical modulator 1A is driven so as to obtain a gradation of pixel number 1 at this timing. The image-forming position of the beam modulated by the optical modulator 1A is moved to pixel numbers 2, 3, . . . at following scanning time division Times 2, 3, . . . in turn. The beam forms an image at last pixel number 2048 at the last scanning time division Time 2048. The beam modulated by the optical modulator 2A forms an image at the position of pixel number 1, at the scanning time division Time 3 when the beam from the optical modulator 1A is forming an image at the position of pixel number 3. Similarly, the beam modulated by the optical modulator 2A is forming an image at a position of pixel number 2 at the scanning time division Time 4. Thus, the image-forming position of the beam modulated by the optical modulator 2A is moved in turn as being delay 2 scanning time divisions compared with the optical modulator 1A. The beam forms an image at the last pixel number 2048 at the scanning time division Time 2050. In a case of a beam modulated by the optical modulators 3A through 6A and other optical modulators in the one-dimensional optical modulator arrays as well as the above described beam, the beam from the optical modulator 6A forms an image at the last pixel number 2048 at the scanning time division Time 2058. One frame is indicated at this time division.

The beam at an optional pixel position in the one frame is a total of the beams from the optical modulators such as 1A, 2A, 3A, 4A, 5A and 6A corresponding to six one-dimensional optical modulator arrays. That is, the gradation of the amount of light can be expressed by using all of the beam. In this embodiment, in a case where the frame frequency is set at 60 [Hz], time for indicating one frame is $1/60$ [seconds], namely 16.7 [msec]. Since the one dimensional optical modulator array has to indicate 2048 pixel lines in the scanning direction during the above mentioned period of time, an indicating time per one pixel line is calculated as $16.7/2058$ [msec], namely 8.12 [µsec] considering the case of the optical modulator 6A. In a case where 256 gradations are expressed as well as the case shown in FIG. 7 and the respective elements of the respective optical modulator arrays are driven by the control means 108 so as to perform an analog-modulation of the respective elements of the respective optical modulator arrays and modulate the actual amount of light from zero to maximum, when the response time of respective elements of the respective one-dimensional optical modulator array is set at 20% of the indicating time, namely 1.63 [µsec] corresponding to the response frequency 613 [kHz], the response time of respective elements of the respective one-dimensional optical modulator arrays is similar to the case of the single one-dimensional optical modulator array. However, since the amount of light in the beam at respective pixel positions is six times as great as in the case of the single one-dimensional optical modulator array, it is possible to indicate an image six times as bright as the in case of the single one-dimensional optical modulator array.

On the other hand, when the respective elements of the respective one-dimensional optical modulator arrays are driven by the control method 108 so as to perform the digital-modulation of the respective elements of the respective one-dimensional optical modulator arrays (to modulate in phases an integral amount of light per unit time from zero to maximum) for expressing 256 gradations, the beam from six optical modulators can be digital-modulated at respective pixel positions. Hence, the response time of the respective elements of the one-dimensional optical modulator arrays is 0.038 [µsec] corresponding to the response frequency of 26.3 [MHz]. In addition, it is possible to indicate an image six times as bright as in the case of the single one-dimensional optical modulator array and the response frequency required for the optical modulators can be reduced to one-sixth.

Furthermore, as described above, in a case where a plurality of the one-dimensional optical modulator arrays are provided in a line and the arrangement pitch is set as natural number multiple of the optical modulator size of the one-dimensional optical modulator array in an element arrangement direction, an advantage in terms of control of the optical modulator can be obtained. That is, referring to FIG. 8, for example, when the beam from the optical modulator 3A forming an image at the position of pixel number 1, the beam from the optical modulator 2A is forming an image at the position of pixel number 3 and the beam from the optical modulator 1A is forming an image at the position of pixel number 5. Accordingly, the optical modulators 1A, 2A and 3A can be controlled by control signals for the pixel numbers 1, 3 and 5 simultaneously, so it is possible to control the respective one-dimensional optical modulator arrays efficiently.

It is noted that the number of the one-dimensional optical modulator arrays forming the optical modulation means 103 is not limited to six. Furthermore, it is possible to indicate a color image by applying a one-dimensional optical modulator array where a color filter is provided to the optical modulation means 103. In this case, the above mentioned structure may be applied to respective colors of R(red), G(green), and B(blue), for example. Furthermore, a color wheel may be provided at a first or latter part of the one-dimensional optical modulator array and the beams of respective colors of R, G, and B may be modulated by time division, so that a color image can be formed. The above mentioned indication of color image forming can be included in the present invention.

According to the above mentioned embodiment, the beam modulated by respective optical modulators in the plurality of one-dimensional optical modulator arrays 201 that are arranged in a line is scanned in a direction perpendicular to the direction of arrangement of optical modulators in the one-dimensional optical modulator arrays 201. A plurality of the beams modulated by the respective optical modulators in the plurality of the one-dimensional optical modulator arrays can be irradiated to respective pixels forming the image in piles multiple times. Therefore, when the respective optical modulators are analog-modulated, it is possible to perform a brighter image indication than in a case where a single one-dimensional optical modulator array is used. Furthermore, when the respective optical modulators are digital-modulated, it is possible to perform an image indication having more gradations than in a case where the single one-dimensional optical modulator array is used, without raising the speed of response of the respective optical modulators in the one-dimensional optical modulator arrays.

According to the above mentioned embodiment, the arrangement pitch of the one-dimensional optical modulator array 201 is set as natural number multiple of the element size of the optical modulator in an element arrangement direction, so that driving of the optical modulator can be controlled efficiently.

According to the above mentioned embodiment, the size of an image projected to a projection indication object surface such as a screen surface may be changed optionally by using a projection optical system for projecting an image for forming the scanned beam to the screen surface as a scanning optical system.

Furthermore, according to the above mentioned embodiment, an element that modulates by changing the reflection direction of the beam with a movable mirror is used for the optical modulator of the one-dimensional optical modulator array 201. Hence, high efficiencies of optical use of the optical modulator can be obtained so that it is possible to indicate a bright image.

According to the above mentioned embodiment, an element driving a movable mirror by an electrostatic force is used for the respective optical modulators of the one-dimensional optical modulator array 201 so that the one-dimensional optical modulator array 201 is formed with a high density by Si(silicon) semiconductor device manufacturing technology.

According to the above mentioned embodiment, a liquid crystal optical switch element is used for the respective optical modulators of the one-dimensional optical modulator array 201 so that it is possible to form the one-dimensional optical modulator array 201 with a high yield rate.

According to the above mentioned embodiment, a micro lens array is used for the lighting means so that efficiencies of optical use of the light from the lighting means can be improved.

According to the above mentioned embodiment, light from a surrounding part of the respective micro lenses 803 of the micro lens array is shielded by a lightproof part (lightproof film 805) so that it is possible to indicate an image having a high contrast with little stray light.

According to the above mentioned embodiment, it is possible to scan at a high speed with the scanning optical system by using a rotating polygon mirror for the scanning optical system.

According to the above mentioned embodiment, it is possible to scan at a variable speed with the scanning optical system easily by using a galvano mirror for the scanning optical system.

According to the above mentioned embodiment, the analog modulation is performed so that the amount of light of the beam is changed from zero to maximum by the optical modulator of the one-dimensional optical modulation array, and therefore a smooth gradation can be expressed by analog modulation.

In this case, the analog modulation of m gradation is performed by respective optical modulators of the one-dimensional optical modulator array 201 and the number of the one-dimensional optical modulator arrays 201 is set as n. Furthermore, the beam modulated by the optical modulator corresponding to the respective one-dimensional optical modulator array 201 is irradiated to the respective pixels in piles multiple times. As a result of this, it is possible to obtain a high gradation number of n×m gradations as the gradation number per one pixel.

According to the above mentioned embodiment, time division driving is performed in a unit time by the optical modulator of the one-dimensional optical modulator array 201. The digital-modulation is performed so as to change by phases the integral amount of light of the beam in a unit time from zero to maximum. As a result of this, the control signal of the optical modulator is digitally processed.

In this case, the digital modulation of m gradations is performed by respective optical modulators of the one-dimensional optical modulator array 201 and the number of the one-dimensional optical modulator arrays 201 is set as n. Furthermore, the beam modulated by the optical modulator corresponding to the respective one-dimensional optical modulator array 201 is irradiated to the respective pixels in piles. As a result of this, it is possible to obtain a high gradation number of n×m gradations as the gradation number per one pixel.

According to the above mentioned embodiment, a modulation formed by a combination of the above mentioned analog-modulation and the above mentioned digital-modulation can be performed by the optical modulator of the one-dimensional optical modulator array 201. In this case, the control signal of the optical modulator can be digitalized and a smooth gradation expression can be performed.

In this case, the analog modulation of L gradations and the digital modulation of m gradations are performed by respective optical modulators of the one-dimensional optical modulator array 201 and the number of the one-dimensional optical modulator arrays 201 is set as n. Furthermore, the beam modulated by the optical modulator corresponding to the respective one-dimensional optical modulator arrays. 201 is irradiated to the respective pixels in piles. As a result of this, it is possible to obtain a high gradation number of n×m×L gradations as the gradation number per one pixel.

Thus, when the analog-modulation of the optical modulation is performed, it is possible to obtain a brighter image than in the case where a single one-dimensional optical modulator array is used. In addition, when the analog-modulation of the respective optical modulators is performed, as compared with the case of a single one-dimensional optical modulator array, a image indication having a great number of gradations can be obtained without increasing the response speed of the respective optical modulators of the one-dimensional optical modulator array.

The present invention is not limited to these embodiments, but variations and modifications may be made without departing from the scope of the present invention.

This patent application is based on Japanese priority patent applications No. 2002-208169 filed on Jul. 17, 2002 and No. 2002-338850 filed on Nov. 22, 2002, the entire contents of which are hereby incorporated by reference.

What is claimed is:

1. An optical scanning device, comprising:
    an optical modulation part configured to modulate a beam and having an one-dimensional optical modulator array wherein a plurality of optical modulators are arranged one-dimensionally;
    a lighting part configured to light the one-dimensional optical modulator array; and
    a scanning optical system configured to deflect the beams modulated by the optical modulators in the one-dimensional optical modulator array in a direction perpendicular to the arrangement direction of the optical modulators,
    wherein a plurality of the one-dimensional optical modulator arrays are arranged in a direction perpendicular to the arrangement direction of the optical modulators, and
    the beams modulated by respective optical modulators of the one-dimensional optical modulator arrays are irradiated in a position where the beams are moved integer multiples of an arrangement pitch in the arrangement direction of the optical modulator arrays so as to be on a pixel in piles.

2. The optical scanning device as claimed in claim 1, wherein the arrangement pitch of the one-dimensional optical modulator array is an integer multiple of the size of the optical modulator in the arrangement direction of the optical modulator.

3. The optical scanning device as claimed in claim 1, wherein the scanning optical system includes a projection optical system for projecting and forming an image with the beam scanned by the scanning optical system at an image indication object surface.

4. The optical scanning device as claimed in claim 1, wherein the optical modulators of the one-dimensional optical modulator array are elements that modulate the beam by changing the reflection direction of the beam with a movable mirror.

5. The optical scanning device as claimed in claim 4, wherein the optical modulators of the one-dimensional optical modulator array are elements that drive the movable mirror by an electrostatic force.

6. The optical scanning device as claimed in claim 1, wherein the optical modulators of the one-dimensional optical modulator array are crystal liquid optical switch elements.

7. The optical scanning device as claimed in claim 1, wherein the lighting part includes a micro lens array having a plurality of micro lenses that correspond to the respective optical modulators of the one-dimensional optical modulator array one to one.

8. The optical scanning device as claimed in claim 7, wherein the micro lens array includes a lightproof part situated between the micro lenses that neighbor each other.

9. The optical scanning device as claimed in claim 1, wherein the optical scanning system is formed by a rotating polygon mirror.

10. The optical scanning device as claimed in claim 1, wherein the optical scanning system is formed by a galvano mirror.

11. The optical scanning device as claimed in claim 1, wherein the respective optical modulators of the one-dimensional optical modulator arrays perform an analog modulation by which the amount of light of the beam is changed from zero to maximum.

12. The optical scanning device as claimed in claim 11, wherein the analog modulation having "m" gradations is performed by the respective optical modulators of the one-dimensional optical modulator arrays, the number of the one-dimensional optical modulator arrays is set as "n", and the beams modulated by the optical modulators corresponding to the one-dimensional optical modulator arrays are irradiated to the respective pixels in piles, and a gradation number per one pixel is n×m as a maxium.

13. The optical scanning device as claimed in claim 1, wherein the respective optical modulators of the one-dimensional optical modulator arrays perform a digital-modulation whereby time division driving is performed in a unit of time and an integral amount of light of the beam in the unit of time is changed in phase from zero to maximum.

14. The optical scanning device as claimed in claim 13, wherein the digital modulation having "m" gradations is performed by the respective optical modulators of the one-dimensional optical modulator arrays, the number of the one-dimensional optical modulator arrays is set as "n", and the beams modulated by the optical modulators corresponding to the one-dimensional optical modulator arrays are irradiated to the respective pixels in piles, and a gradation number per one pixel is n×m as a maxium.

15. The optical scanning device as claimed in claim 1, wherein the respective optical modulators of the one-dimensional optical modulator arrays perform a combined modulation comprising an analog-modulation and a digital-modulation, the amount of light of the beam is changed from zero to maximum by the analog-modulation, and time division driving is performed in a unit time and an integral amount of light of the beam in the unit time is changed in phase from zero to maximum by the digital-modulation.

16. The optical scanning device as claimed in claim 15, wherein the analog-modulation having "m" gradations and the digital-modulation having "L" gradations are performed by the respective optical modulators of the one-dimensional optical modulator arrays, the number of the one-dimensional optical modulator arrays is set as "n", and the beams modulated by the optical modulators corresponding to the one-dimensional optical modulator arrays are irradiated to the respective pixels in piles, and a gradation number per one pixel is n×m×L as a maxium.

17. An optical scanning device, comprising:

an optical modulation means for modulating a beam and having an one-dimensional optical modulator array wherein a plurality optical modulators are arranged one-dimensionally;

means for lighting the one-dimensional optical modulator array; and means for deflecting the beams modulated by the optical modulators in the one-dimensional optical modulator array in a direction perpendicular to the arrangement direction of the optical modulators, wherein a plurality of the one-dimensional optical modulator arrays are arranged in a direction perpendicular to the arrangement direction of the optical modulators, and the beams modulated by respective optical modulators of the one-dimensional optical modulator arrays are irradiated in a position where the beams are moved integer multiples of an arrangement pitch in the arrangement direction of the optical modulator arrays so as to be on a pixel in piles.

18. An optical scanning method, comprising:

modulating a beam by a one-dimensional optical modulator array wherein a plurality of optical modulators are arranged one-dimensionally;

lighting the one-dimensional optical modulator array;

deflecting the beams modulated by the optical modulators in the one-dimensional optical modulator array in a direction perpendicular to the arrangement direction of the optical modulators, wherein the plurality of one-dimensional optical modulator arrays are arranged in the direction perpendicular to the arrangement direction of the optical modulators; and irradiating the beams modulated by respective optical modulators of the one-dimensional optical modulator arrays in a position where the beams are moved integer multiples of an arrangement pitch in the arrangement direction of the optical modulator arrays so as to be on a pixel in piles.

* * * * *